United States Patent [19]

Alcorn

[11] 4,372,465
[45] Feb. 8, 1983

[54] COUNTER DISPENSER FOR CONES

[76] Inventor: Candace J. Alcorn, 3697 W. Valley Green, Ft. Lauderdale, Fla. 33328

[21] Appl. No.: 221,702

[22] Filed: Dec. 31, 1980

[51] Int. Cl.³ .............................................. B65D 88/54
[52] U.S. Cl. .................................... 221/131; 221/279; 221/310
[58] Field of Search ............... 221/307, 308, 279, 283, 221/310, 226, 20, 52, 56, 124, 131, 132

[56] References Cited

U.S. PATENT DOCUMENTS

| | | | |
|---|---|---|---|
| 2,226,308 | 12/1940 | Gibbs | 312/71 |
| 2,562,599 | 7/1951 | Buttermann | 221/307 |
| 3,168,214 | 2/1965 | Breazeale | 221/119 |
| 3,211,329 | 10/1965 | Boyd | 221/308 |
| 3,357,760 | 12/1967 | Shelley et al. | 312/71 |
| 3,567,293 | 3/1971 | Salcman | 221/279 |
| 3,623,636 | 11/1971 | D'Ercoli | 221/307 |
| 4,033,478 | 7/1977 | House | 221/279 |
| 4,126,248 | 11/1978 | House | 221/241 |

*Primary Examiner*—David A. Scherbel
*Attorney, Agent, or Firm*—Oltman and Flynn

[57] ABSTRACT

The present ice cream cone dispenser has an elongated hollow housing with a closed bottom and an open top and a peripheral flange at the top for mounting it at an opening in a counter top. A compression spring urges a follower plate upward inside the housing, and a flexible line limits the upward expansion of the spring to retain the follower plate within the housing when the spring is fully expanded. A shipping container holding stacked cones is inserted down into the housing until the lowermost cones are engaged from below by the follower plate. An apertured retainer is snapped into place at the counter top opening to hold down the uppermost cones which, however, may be removed manually through an opening in the retainer. The entire dispenser is removeable for cleaning purposes.

13 Claims, 6 Drawing Figures

COUNTER DISPENSER FOR CONES

SUMMARY OF THE INVENTION

This invention relates to a dispenser for generally cone-shaped articles, such as edible cones for holding ice cream, frozen yogurt or similar comestibles.

Retail outlets for ice cream cones, frozen yogurt cones and the like typically have the cones stored in dispensers which are located above the counter top level or sometimes left in the cardboard containers in which they were delivered to the store. In either case, the cones are likely to be inconveniently located for the employee filling the orders for ice cream or frozen yogurt cones and the existing dispenser is not aesthetically pleasing.

The present invention is directed to a novel dispenser for storing generally cone-shaped articles, such as Sweetheart 210 cones, within the counter, so that they are out of the way yet conveniently accessible for filling orders.

Preferably, this invention has an open-topped housing which is to be mounted at an opening in the counter top to extend down below the counter top. This housing snugly receives and locates the usual shipping container in which stacks of cones are delivered to the store. A spring-pressed follower plate in the housing of the dispenser engages the stacked cones from below and pushes them up. An apertured yieldable retainer is seated in the open upper end of the housing. The uppermost article in a stack can be pulled up manually through an opening of this retainer. As the cones are removed, the spring-biased follower moves up along the inside of the container to maintain the uppermost articles projecting up through the retainer at the top.

A principal object of this invention is to provide a novel and improved dispenser for ice cream cones which is to be mounted below a counter top.

Another important object of this invention is to provide such a dispenser which is capable of dispensing cones immediately after the removal of the closed ends of the shipping container and the insertion of that container into the housing of the dispenser, without requiring removal of the cones or other generally cup-shaped articles from the shipping container.

Further objects and advantages of this invention will be apparent from the following detailed description of a presently preferred embodiment, shown in the accompanying drawings.

Before explaining the disclosed embodiment of the present invention in detail, it is to be understood that the invention is not limited in its application to the details of the particular arrangement shown, since the invention is capable of other embodiments and other sized objects. Also, the terminology used herein is for the purpose of description and not of limitation.

DETAILED DESCRIPTION

Figure 2:
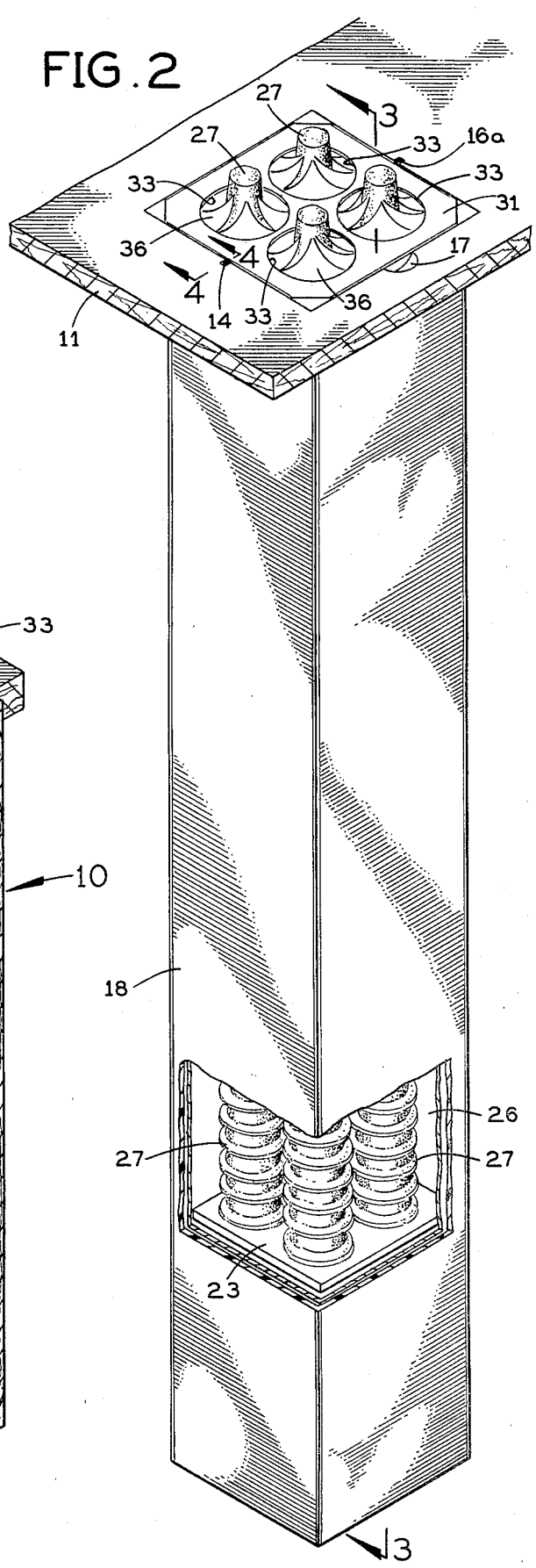
FIG. 2 is a perspective view of the assembled dispenser with parts broken away for clarity.

The dispenser of the present invention is shown mounted in a counter or cabinet 10 which holds paper products and other essentials for dispensing ice cream, frozen yogurt or the like (not shown) which is to be used to accompany the dispensing of the cones in the present dispenser. The counter has a flat horizontal top 11 formed with a square opening 12 (FIG. 3) which is surrounded at the top by a shallow, rectangular, marginal recess 13. On opposite sides of the opening 12 the counter top supports flexible and resilient spring clips 14 (FIG. 4), each of which is located in that side of the marginal recess 13 and is fastened to the counter top by a respective screw 15. Each spring clip presents an upwardly and inwardly inclined leg 16 which terminates in a rounded, turned-over lip 16a at the top which is located at substantially the level of the top surface of the counter top 11. As shown in FIG. 2, at one side of the marginal recess 13 the counter top is formed with a rounded depression 17 into which a person's finger may be inserted.

An elongated hollow housing 18 (FIG. 1) is inserted down through the counter top opening 12. In the embodiment shown this housing is of square cross-section between an outwardly projecting, horizontal flange 19 at its upper end (FIG. 4) and a horizontal wall 20 (FIG. 3) which closes its lower end. The top flange 19 on housing 18 is received in the marginal recess 13 in the counter top 11 at the upper end of the opening 12 and it rests directly on the counter top at this recess. The vertical side walls of housing 18 have slight clearances from the sides of the counter top opening 12, as shown in FIG. 4. The bottom wall 20 of housing 18 carries a short, upwardly projecting annular rib 21 larger than the spring diameter. The vertical side walls of housing 18 carry flat-topped ribs or projections 22 on the inside which together define an upwardly-facing internal shoulder located a short distance above the bottom wall 20.

Figure 3:
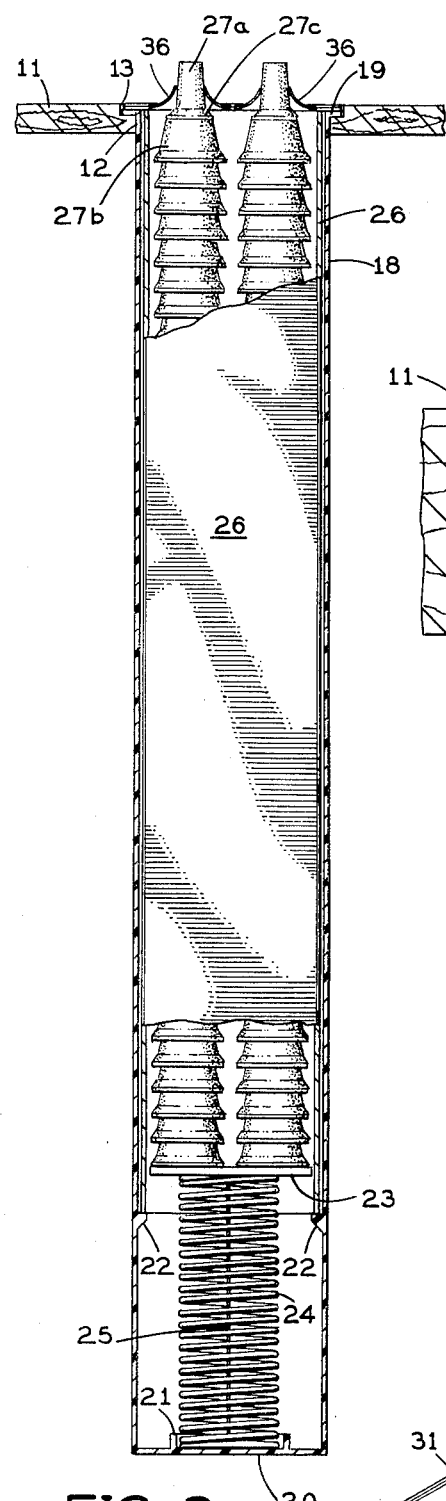
FIG. 3 is a vertical section taken along the line 3—3 in FIG. 2, showing the dispenser completely filled with cones.
Figure 4:
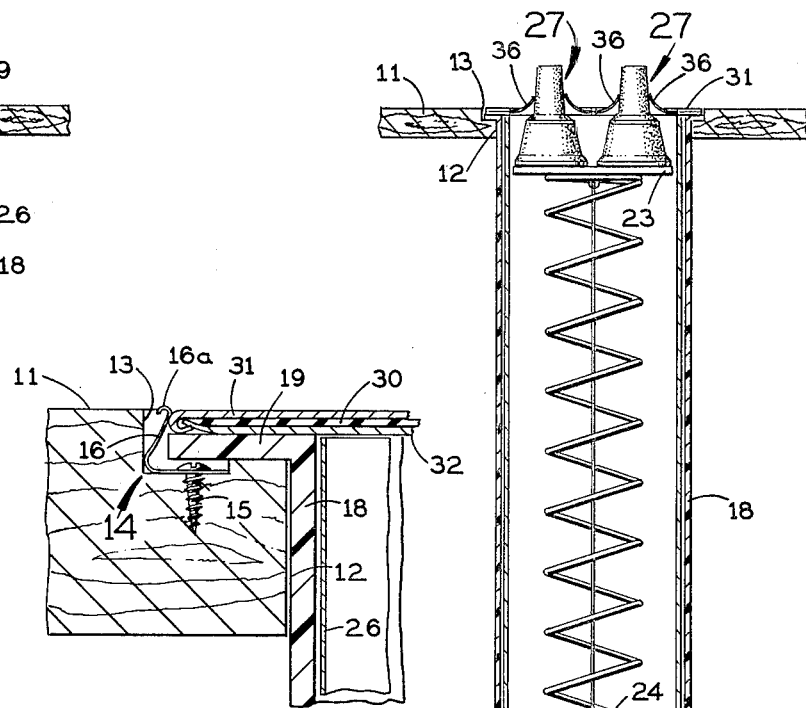
FIG. 4 is an enlarged fragmentary vertical section of the upper end of the dispenser taken along the line 4—4 in FIG. 2.
Figure 6:
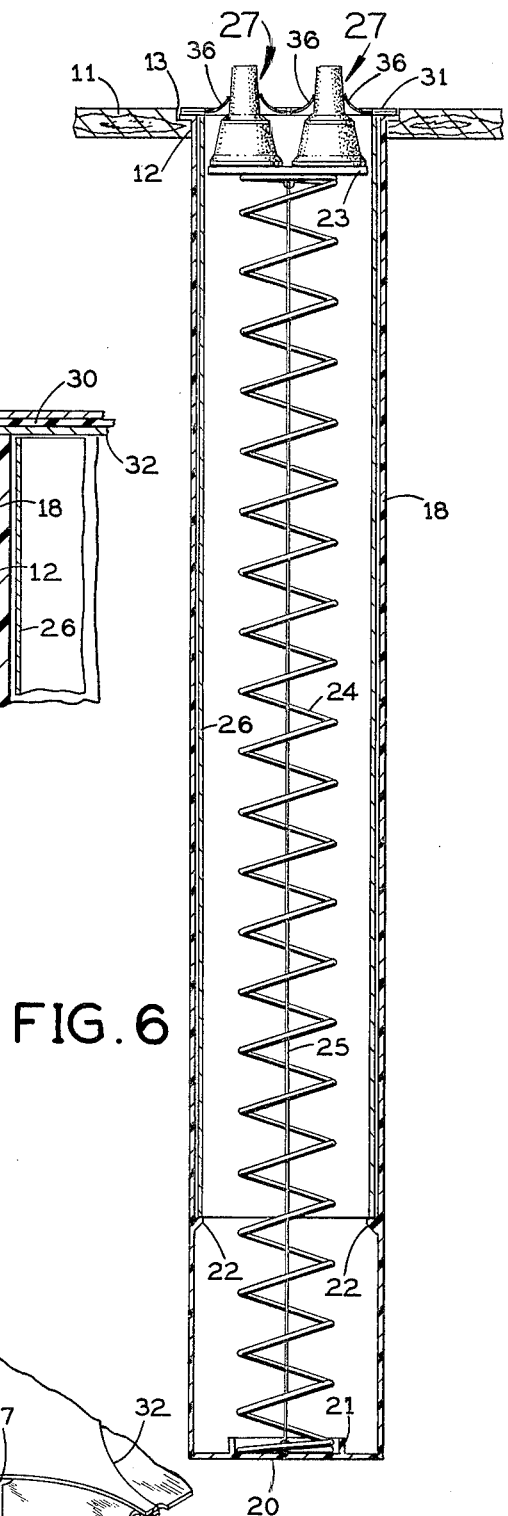
FIG. 6 is a view similar to FIG. 3 and showing the dispenser almost empty of cones.

A removeable follower in the form of a horizontal flat plate 23 (FIG. 3) is loosely received inside the housing 18 for movement up and down between the lowermost position shown in FIG. 3 and the uppermost position shown in FIG. 6. A coil spring 24 is engaged under compression below the follower plate 23, with its lower end seated inside the annular rib 21 on the inside of the bottom wall 20 of housing 18 and its upper end engaging beneath the follower plate. This spring biases the follower plate upward inside housing 18 with a relatively light force that can be overcome easily by manual pressure. A flexible tie line 25 has its opposite ends fastened to the lowermost and uppermost turns of the spring 24 to limit the expansion of the spring to the length shown in FIG. 6, in which the follower plate 23 is a short distance below the upper end of housing 18.

Figure 1:
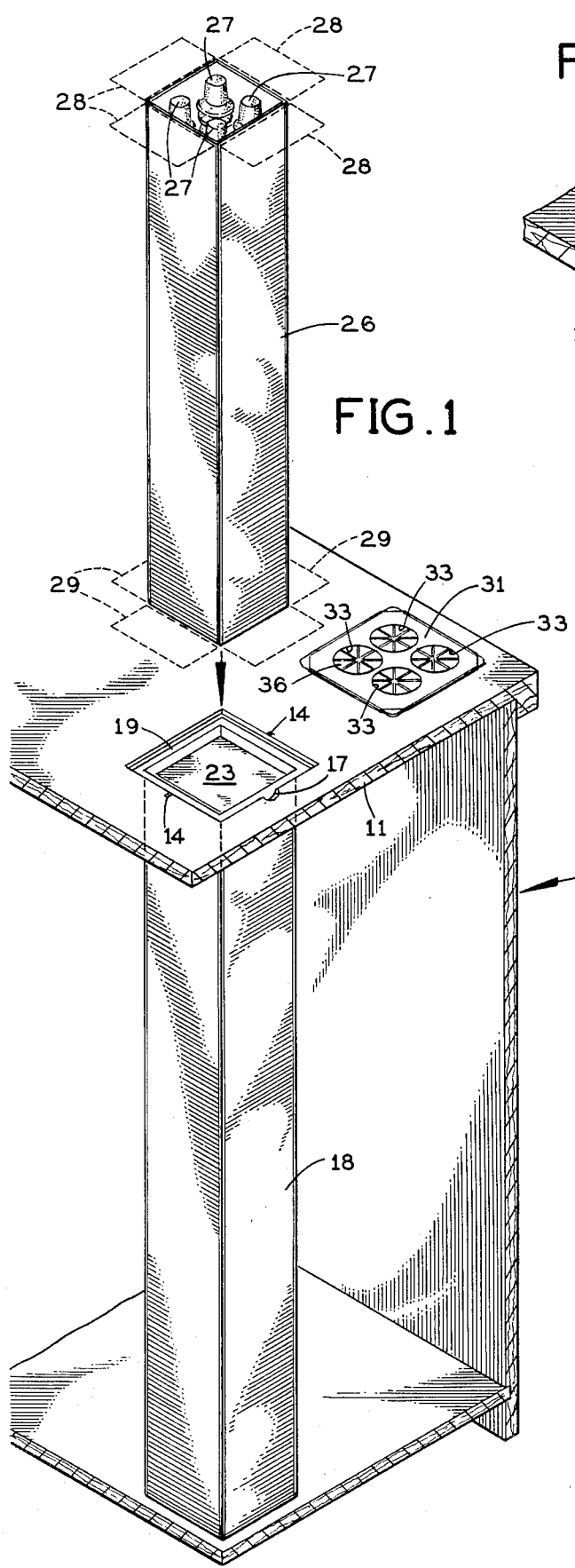
FIG. 1 is an exploded perspective view showing the different parts of the present dispenser.

The square internal cross-section of housing 18 is just slightly larger than the square external cross-section of the standard shipping container 26 (FIG. 1) in which edible wafer cones 27 for ice cream, yogurt or similar frozen comestible products are supplied to retail outlets. As shown in FIG. 1, this container 26 holds four vertical stacks of such cones. The cones themselves need not be uniformly conical throughout their length but may, as shown in FIG. 3, have a stepped configuration with a slightly tapered, narrow, closed end 27a and a wider, tapered, open, opposite end 27b joined by a tapered shoulder 27c. Normally, the opposite ends of the container 26 are closed by folded-over end flaps 28 and 29, shown in phantom and folded out in FIG. 1. These end flaps are removed before the container 26 is inserted down into the housing 18, leaving both ends of the container open. The cardboard separation piece and the paper lines are also removed before placing in the dispenser.

The cones 27 are upside down in the container 26 when the container is received in the housing 18 (FIG. 3). That is, the closed narrow ends of the cones are up and their wider open ends are down. (This is the opposite of the instructions for opening on the cone box.) When the container 26 is fully inserted in housing 18, the lower end of the container rests on the internal shoulder 22 in the housing, as shown in FIG. 3. The lowermost cones 27 in the four stacks of cones inside the container 26 engage the top of the follower plate 23, holding the spring 24 compressed as shown in FIG. 3.

Figure 5:
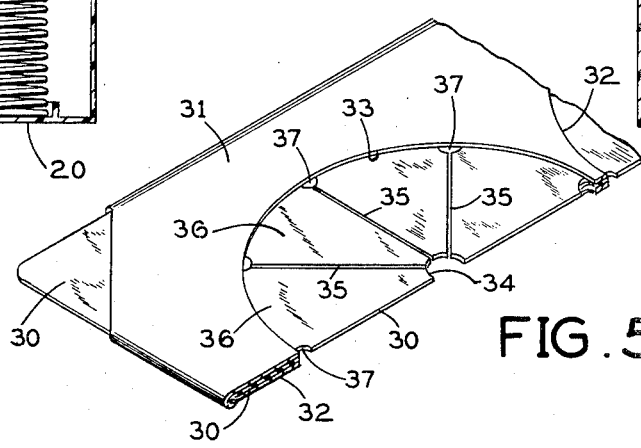
FIG. 5 is a fragmentary perspective view showing part of the retainer at the upper end of the dispenser.

At the counter top recess 13 a retainer is held in place by the spring clips 14 to hold the uppermost cones 27 in the upper end of the container 26. As shown in FIGS. 4 and 5, this retainer comprises a thin sheet 30 of flexible and resilient, rubber-like material sandwiched between rigid upper and lower metal plates 31 and 32, which are joined at their peripheral edges by turning down the upper plate 31 to engage the lower plate from below, except at the corners. The upper and lower plates are formed with four circular openings 33 (FIGS. 1 and 2), which are aligned respectively with the four stacks of cones 27 in the container 26 when the retainer 30-32 is snapped in place between the spring clips 14 to a position resting directly on the flange 19 on the upper end of housing 18, as shown in FIG. 4. The sheet 30 of rubberlike material extends across each of these openings 33. At the center of each opening 33 the rubber-like sheet 30 is formed with a circular hole 34 (FIG. 5) which is smaller than the closed end of a cone 27, and from this hole radial slits 35 extend out to the edge of the opening 33 and divide the rubber-like sheet 30 into tapered lips 36 similar to slices of a pie. These radial slits 35 terminate in small circular openings 37 which facilitate the flexing of the lips 36 at the edge of the opening 33.

As shown in FIG. 3, when the shipping container 26 is filled with cones 27, the uppermost cones project up through the holes 34 in the rubber-like panel 30 and spread apart the lips 36 of this panel, flexing these lips upward. However, these lips 36 exert sufficient resilient restraint on the uppermost cones 27 to prevent them from moving up through the respective openings 34 in the rubber-like sheet 30 unless a person grasps the protruding upper end of the uppermost cone and deliberately pulls it up through. The restraint exerted by the lips 36 on the upper ends of the stacks of cones is sufficient to hold the spring 24 fully compressed, as shown in FIG. 3.

As cones are removed manually from the upper end of container 26 to fill orders for ice cream, frozen yogurt or the like, the spring 24 expands and holds the follower plate 23 pressed up against the lowermost cones in the four stacks. When these lowermost cones reach the counter top opening, as shown in FIG. 6, the flexible line 25 will be taut, preventing any further expansion of spring 24. After the removal of the last cones 27, the upper retainer 30-32 is removed from the counter top by a person's inserting his or her finger into the depression 17 (FIG. 2) at the edge of the counter top opening until it is beneath the upper retainer and then lifting it up out of the recess 13 around the counter top opening. This is enough pressure to release the spring clips. Then the empty shipping container 26 may be pulled up out of the housing 18 and replaced by a similar container filled with cones.

In one practical embodiment of the invention, the shipping container 26 is 30 inches long and 5 inches square, the housing 18 is 5¼ inches square on the inside, the follower plate 23 is 4¾ inches square, and the flexible line 25 is about 36 inches long, limiting the expanded length of spring 24 to about 36 inches.

From the foregoing detailed description of the presently preferred embodiment of the invention, it will be evident that this invention enable edible cones for ice cream, frozen yogurt or similar comestibles to be stored beneath the counter top, where they are out of the way and yet are immediately and conveniently accessible. In addition, the present dispenser is exceptionally convenient to use with a standard shipping container for the cones because all that is required is to remove the ends of this container, after which it can be inserted down into the dispenser housing 18 without requiring any handling of the cones themselves.

I claim:

1. A dispenser for generally cone-shaped articles stacked in a plurality of stacks in an elongated shipping container, said shipping container having a predetermined external cross-section between its top and bottom, said dispenser comprising:
   an open-topped housing having an internal cross-section substantially complementary to the external cross-section of said shipping container for slidably receiving the latter;
   means for mounting said housing in an opening in a counter top with said housing extending down from the counter top;
   a follower mounted for vertical movement within said housing and shaped and dimensioned to move freely along the inside of the shipping container when the latter is received in said housing with its top and bottom open;
   yieldable means urging said follower upward to push up the stacks of generally cone-shaped articles in said shipping container;
   and yieldable retainer means at the top of said housing for holding down the uppermost generally cone-shaped articles in the stack, said retainer having a plurality of apertures, said plurality of apertures equal to said plurality of stacks of cone-shaped articles in said shipping container, said apertures generally aligned with said stacks of cone-shaped articles and having a cross-section that is greater than the greatest cross-section of the cone-shaped articles in said aligned stack of cone-shaped articles;
   and said apertures partially covered with a sheet of rubberlike material.

2. A dispenser according to claim 1, wherein said housing presents internal transverse shoulder means spaced below its upper end by substantially the length of said shipping container for engagement by the lower end of the shipping container to position the upper end of the shipping container substantially even with the upper end of said housing.

3. A dispenser according to claim 1, and further comprising means for limiting the upward movement of said follower.

4. A dispenser according to claim 1, wherein said yieldable retainer means at the top of said housing comprises a plurality of adjoining flexible and resilient lips of rubber-like material extending around a central opening through which the uppermost article in the stack projects, and rigid means supporting said lips and mounted at the top of said housing.

5. A dispenser according to claim 1, wherein said yieldable means urging said follower upward is a coil spring under compression below said follower.

6. A dispenser according to claim 5, wherein said coil spring is engaged between the bottom of said housing and the underside of said follower, and further comprising a flexible line extending between the opposite ends of said spring and having a length effective to limit the expansion of the spring to prevent said follower from moving up out of said housing.

7. A dispenser according to claim 6, wherein said housing presents internal transverse shoulder means spaced below its upper end by substantially the length of said shipping container for engagement by the lower end of the shipping container to position the upper end of the shipping container substantially even with the upper end of said housing.

8. A dispenser according to claim 7, wherein said yieldable means at the top of said housing comprises a plurality of adjoining flexible and resilient lips of rubber-like material extending around a central opening through which the uppermost article in the stack projects, and rigid plate means supporting said lips and mounted on top of said housing.

9. A dispenser for generally cone-shaped articles stacked in a plurality of adjacent stacks in a vertically elongated shipping container having a rectangular external cross-section between its top and bottom, said dispenser comprising:

an open-topped housing having a rectangular internal cross-section substantially complementary to the external cross-section of said shipping container for slidably receiving the latter;

means for mounting said housing in an opening in a counter top with said housing extending down from the counter top;

a follower plate mounted for vertical movement within said housing and shaped and dimensioned to move freely along the inside of the shipping container when the latter is received in said housing with its top and bottom open;

a spring under compression below said follower plate urging the follower plate upward to push the stacks of generally cone-shaped articles up along the inside of said container;

and a retainer disposed generally flush with the top of and extending across the top of said housing and defining openings aligned with the stacks of articles through which the articles may be pulled up manually, said retainer presenting flexible and resilient fingers adjacent said openings for holding down the uppermost articles.

10. A dispenser according to claim 9, and further comprising means for limiting the upward movement of said follower plate.

11. A dispenser according to claim 10, wherein said last-mentioned means is a flexible line extending between the opposite ends of said spring and having a length effective to limit the expansion of the spring to prevent said follower plate from moving up out of said housing.

12. A dispenser according to claim 11, wherein said housing carries an internal transverse shoulder for engagement by the lower end of a shipping container inserted into the housing, said shoulder being spaced below the open top of said housing by substantially the length of the shipping container, whereby to position the shipping container with its upper end substantially at the level of the open top of said housing.

13. A dispenser according to claim 9, wherein said housing carries an internal transverse shoulder for engagment by the lower end of a shipping container inserted into the housing, said shoulder being spaced below the open top of said housing by substantially the length of the shipping container, whereby to position the shipping container with its upper end substantially at the level of the open top of said housing.

* * * * *